(12) United States Patent
Chu et al.

(10) Patent No.: US 10,015,029 B2
(45) Date of Patent: Jul. 3, 2018

(54) BLUETOOTH SIGNAL RECEIVING METHOD AND DEVICE USING IMPROVED SYMBOL TIMING OFFSET COMPENSATION

(71) Applicant: ABOV SEMICONDUCTOR CO., LTD., Cheongju, Chungcheongbuk-Do (KR)

(72) Inventors: Sang Young Chu, Gyeonggi-do (KR); Ki Tae Moon, Seoul (KR); Suk Kyun Hong, Seoul (KR)

(73) Assignee: ABOV SEMICONDUCTOR CO., LTD., Cheongju, Chungcheongbuk-do (KR)

( * ) Notice: Subject to any disclaimer, the term of this patent is extended or adjusted under 35 U.S.C. 154(b) by 0 days.

(21) Appl. No.: 15/390,385

(22) Filed: Dec. 23, 2016

(65) Prior Publication Data

US 2017/0195150 A1    Jul. 6, 2017

(30) Foreign Application Priority Data

Dec. 30, 2015    (KR) ........................ 10-2015-0189418

(51) Int. Cl.
*H04L 27/144*    (2006.01)
*H04B 7/26*    (2006.01)
*H04L 27/156*    (2006.01)

(52) U.S. Cl.
CPC ............. *H04L 27/144* (2013.01); *H04B 7/26* (2013.01); *H04L 27/156* (2013.01)

(58) Field of Classification Search
CPC ............ H04B 7/26; H03L 7/08; H04L 7/0335
See application file for complete search history.

(56) References Cited

U.S. PATENT DOCUMENTS 6,487,240 B1    11/2002    Chen
6,642,797 B1    11/2003    Luo et al.
(Continued)

FOREIGN PATENT DOCUMENTS

JP    2006-109476 A    4/2006
JP    4383445 B2    12/2009
(Continued)

*Primary Examiner* — Syed Haider
(74) *Attorney, Agent, or Firm* — Mintz Levin Cohn Ferris Glovsky and Popeo, P.C.; Kongsik Kim

(57) ABSTRACT

Disclosed herein are a Bluetooth signal receiving device and a Bluetooth Smart receiving method. The Bluetooth signal receiving device includes a frequency shift demodulator circuit, a sampler circuit, a training bit pattern discriminator circuit, and a symbol timing offset compensation circuit. The frequency shift demodulator circuit generates a baseband signal by performing frequency shift modulation on a received signal. The sampler circuit samples the baseband signal based on a symbol timing, and generates a plurality of series of bit streams based on sampled values. The training bit pattern discriminator circuit determines whether the plurality of series of bit streams generated by the sampler circuit satisfies a training bit pattern condition. The symbol timing offset compensation circuit compensates the symbol timing of the baseband signal based on a measured error metric as an effective error metric if the plurality of series of bit streams satisfies the training bit pattern condition.

13 Claims, 11 Drawing Sheets

(56) References Cited

U.S. PATENT DOCUMENTS

| | | |
|---|---|---|
| 6,751,273 B1 | 6/2004 | Park et al. |
| 6,973,142 B2 | 12/2005 | Chen et al. |
| 7,376,207 B2 | 5/2008 | Chen |
| 7,570,717 B2 | 8/2009 | Kim et al. |
| 7,639,762 B2 | 12/2009 | Weizhong |
| 7,664,205 B2 | 2/2010 | Wang et al. |
| 8,401,120 B1 | 3/2013 | Ozgur |
| 8,411,797 B2 | 4/2013 | Suissa et al. |
| 8,478,136 B2 | 7/2013 | Hayee et al. |
| 8,903,023 B1 | 12/2014 | Wang et al. |
| 9,425,807 B2 | 8/2016 | Bachmann et al. |
| 2009/0154602 A1* | 6/2009 | Furman ............ H04L 7/042 375/324 |
| 2013/0272722 A1* | 10/2013 | Hayee ............ H04B 10/2543 398/208 |
| 2015/0180645 A1* | 6/2015 | Taylor ............ H04L 7/0087 375/226 |
| 2015/0222419 A1* | 8/2015 | Bachmann ............ H03L 7/08 375/327 |

FOREIGN PATENT DOCUMENTS

| | | |
|---|---|---|
| JP | 2011-166209 A | 8/2011 |
| JP | 5454181 B2 | 3/2014 |
| KR | 2001-0100573 A | 11/2001 |
| KR | 10-0339661 B1 | 6/2002 |
| KR | 10-0525002 B1 | 10/2005 |
| KR | 10-0544245 B1 | 1/2006 |
| KR | 2010-0035726 A | 4/2010 |
| KR | 10-1000861 B1 | 12/2010 |
| KR | 10-1026407 B1 | 4/2011 |

\* cited by examiner (Related Art)

(Related Art)

BLUETOOTH SIGNAL RECEIVING METHOD AND DEVICE USING IMPROVED SYMBOL TIMING OFFSET COMPENSATION

CROSS-REFERENCE TO RELATED APPLICATION

This application claims under 35 U.S.C. § 119(a) the benefit of Korean Patent Application No. 10-2015-0189418 filed on Dec. 30, 2015, which is incorporated herein by reference.

TECHNICAL FIELD

The present invention relates to technology for a symbol timing offset compensation method for a Bluetooth Smart receiving device, and more particularly to a method for compensating for symbol timing offset by applying a selective bit stream decision-oriented technique in a Bluetooth Smart device, and a circuit to which the method is applied.

The present invention was derived from the research conducted as a part of the Industrial Core Technology Development Project sponsored by the Korean Ministry of Trade, Industry and Energy and the Korea Institute of Industrial Technology Evaluation and Planning [Project Management Number: 10052626; Project Name: Development of BLE (Bluetooth Low-Energy) v4.2 Supporting Communication Semiconductor IP and Location Tracking SoC].

BACKGROUND ART

The configuration of a typical Bluetooth receiver is introduced in FIG. 1. Referring to FIG. 1, the Bluetooth receiver includes a front-end circuit 110 configured to obtain a baseband signal by demodulating a received signal, a filter 120 configured to selectively pass a desired channel therethrough and remove an undesired channel, and a recovery circuit 130 configured to convert the received baseband signal in the frequency domain into time domain symbols.

A Bluetooth transmitter generates a carrier frequency-based modulated signal by modulating a baseband signal. A Bluetooth Smart transmitter uses a Gaussian frequency shift keying modulation method that has a modulation index h ranging from 0.45 to 0.55. The frequency shift keying method refers to a method of transmitting digital information through the variation of the discrete frequency of a carrier.

FIG. 3 is a diagram showing the frequency characteristic of a modulated signal that is transmitted by a Bluetooth transmitter in an ideal environment in which noise and frequency offset are not present. Referring to FIG. 3, there are shown the minimum and maximum frequency shifts of a signal having a symbol transmission speed Fs of 1 Msps and a modulation index h of 0.5 that is transmitted via a carrier frequency Fc in the 2.4 GHz band. When the symbol transmission speed Fs is 1 Msps, the signal of the bit value "1" corresponding to the symbol "+1" has a frequency shift $F_+$ of +250 kHz (a frequency shift in a positive (+) direction) from a center frequency Fc, the signal of the bit value "0" corresponding to the symbol "−1" has a frequency shift $F_-$ of −250 kHz (a frequency shift in a negative (−) direction) from the center frequency Fc.

Referring back to FIG. 1, the front-end circuit 110 of the Bluetooth Smart receiver obtains a frequency-demodulated waveform in a baseband by using an analog or digital frequency demodulator, and estimates transmission bit information by deciding signs at symbol intervals.

FIG. 4 is an eye diagram in which frequency-demodulated waveforms are accumulated at symbol intervals. A Bluetooth Smart receiver obtains a frequency-demodulated waveform in a baseband by using an analog or digital frequency demodulator. When frequency-demodulated waveforms are accumulated at symbol intervals, an eye diagram, such as that of FIG. 4, is obtained. A point at which the gap between a frequency shift in a positive (+) direction and a frequency shift in a negative (−) direction is greatest corresponds to an optimum symbol timing phase at which inter-symbol interference is lowest. Errorless transmission bit information is obtained by performing sign decision at symbol intervals while continuously maintaining an optimum timing phase.

Since a signal is received in the state in which the quality thereof has been degraded due to signal magnitude offset, carrier offset, timing offset, etc. attributable to mismatch between a transmitter and the receiver, the receiver must be prepared for errorless bit demodulation by implementing a recoverer for corresponding offset.

FIG. 2 is a diagram showing a typical packet of Bluetooth Smart. Referring to FIG. 2, the packet of Bluetooth Smart includes a preamble interval 210, an access address interval 220, a protocol data unit (PDU) interval 230, and a CRC interval 240. Since a Bluetooth receiver must identify an address during the access address interval 220 and must identify and process data during the PDU interval 230, preparation for the identification of the address and the data must be completed during the preamble interval 210. Accordingly, there is a time limitation in that operations, such as automatic gain control, frequency offset compensation, timing compensation, etc., must be performed within a preamble interval of Bluetooth or Bluetooth Smart in the front-end circuit 110 of the Bluetooth receiver.

For a receiver to estimate offset, a previously agreed upon pilot signal is required between a transmitter and the receiver. According to the Bluetooth Smart standard, a bit stream corresponding to the start of a packet is transmitted in the preamble interval 210. The bit stream of the preamble interval 210 is determined by the first transmission bit of the access address interval 220. When the first transmission bit of the access address interval 220 is "1," the bit stream value "01010101b" of the preamble interval 210 is transmitted. When the first transmission bit of the access address interval 220 "0," the bit stream value "10101010b" of the preamble interval 210 is transmitted. Since the frequency-demodulated waveform of the preamble interval 210 has a sine wave-like form in which negative (−) and positive (+) frequency shifts are repeated, it has a characteristic considerably appropriate for estimating symbol timing offset, and is appropriate for being used as a pilot signal. Initial symbol timing acquisition is performed to obtain the correlation between a stored preamble and a received signal and to estimate a point at which a peak occurs as an optimum symbol timing.

An example of a preceding technology for compensating for the symbol timing offset of a received signal in a Bluetooth receiver is disclosed in U.S. Pat. No. 8,401,120 entitled "Symbol Error Acquisition for Bluetooth Enhanced Data Rate Packets."

The preceding technology is configured to detect a phase error by first acquiring an initial timing during a preamble interval and then monitoring changes in timing in the following protocol data unit (PDU) interval. That is, the preceding technology is a technology configured to detect a phase error by comparing the phase of the output symbol of a symbol demodulator with the phase of a received signal, to provide notification that a current symbol timing is not reliable when the phase error exceeds a threshold value, and to compensate for a symbol timing error.

However, according to the preceding technologies, inter-symbol interference occurs due to a Gaussian filter during the frequency shift keying process of the Bluetooth Smart standard and thus a frequency shift waveform is distorted, and the jitter of a timing error detector occurring due to the randomness of a data symbol in access address and protocol data unit intervals causes a significant problem. In particular, in a current situation in which a demand for a high-sensitivity receiver supporting a value equal to or lower than −90 dBm is increasing, it is difficult to perform sufficient offset compensation on a Bluetooth Smart signal by using the conventional preceding technologies. Therefore, there is an increasing need for a means that is capable of dealing with this situation.

SUMMARY OF THE DISCLOSURE

The present invention relates to technology for a symbol timing offset compensation method for a Bluetooth Smart receiving device. An object of the present invention is to provide a device and method for continuously tracking symbol timing offset, rather than estimating frequency offset once.

Since the receiving sensitivity defined in the Bluetooth Smart standard is merely −70 dBm and the signal to noise power ratio in a corresponding signal magnitude region corresponds to 30 dB or more, a noise component is substantially insignificant. Accordingly, a symbol timing phase obtained in a preamble interval has considerably high accuracy. However, since a demand for a high-sensitivity receiver equal to or lower than −90 dBm is increasing in line with the development of implementation technology and the received signal to noise power ratio in a corresponding signal magnitude region is decreased to 10 dB or less, the reliability of the estimated value of carrier offset measured in the preamble interval is significantly poor due to the magnitude of relatively increased noise. Accordingly, there is a need for a device for continuously tracking symbol timing offset also in access address and protocol data unit intervals in order to reduce the magnitude of timing offset estimation jitter by means of an averaging effect, rather than performing the recovery of a timing phase through only single acquisition in a preamble interval.

Since Bluetooth Smart prioritizes costs and low power, it allows clock inaccuracy within the maximum range of +/−50 kHz in a packet in a period of 625 Hz in order to ease the level of analog circuit design specifications. An optimum symbol timing phase may vary continuously due to clock inaccuracy. According to the standard, a variation in phase is limited in an access address interval and a protocol data unit interval, and thus the degradation of performance is not significantly serious even when a separate tracking device is not used. However, to meet a demand for a high-sensitivity receiver, it is necessary to implement a timing tracking device and support the best performance.

A non-data aided (NDA) prediction technique using roughly estimated values for unspecified data, which is commonly used in the preceding technologies, is disadvantageous in that high jitter occurs. An attempt is made to implement a structure for reducing jitter by using a loop filter in order to mitigate the above disadvantage. In packet communication in which burst transmission is performed at short time intervals, a problem arises in that self noise generated during training time directly degrades system performance, unlike in circuitry communication in which the training time taken for convergence does not cause a problem.

Accordingly, the present invention is intended to provide a device and method for implementing a high-sensitivity receiver that is capable of overcoming structural problems (high jitter and a long training period) and a performance problem that occur when implementation is performed using the conventional NDA prediction technique. For this purpose, an object of the present invention is to provide a device and method for acquiring and tracking a symbol timing phase by using a "selective bit stream decision-directed" technique.

That is, an object of the present invention is to provide a device and method capable of dynamically tracking randomly generated symbol timing offset by acquiring a symbol timing phase in the preamble interval of a Bluetooth Smart packet and tracking the symbol timing phase and offset in the access address interval and protocol data unit interval thereof.

According to an aspect of the present invention, there is provided a Bluetooth signal receiving device including: a frequency shift demodulator circuit configured to generate a baseband signal by performing frequency shift modulation on a received signal; a sampler circuit configured to sample the baseband signal based on a symbol timing (an initially acquired symbol timing) and to generate a plurality of series of bit streams based on sampled values (particularly, the signs of sampled signals); a training bit pattern discriminator circuit configured to determine whether the plurality of series of bit streams generated by the sampler circuit satisfies a training bit pattern condition (101b or 010b); and a symbol timing offset compensation circuit configured to compensate the symbol timing of the baseband signal based on a measured error metric as an effective error metric if the plurality of series of bit streams satisfies the training bit pattern condition.

The training bit pattern condition may be set by applying a selective bit stream decision-directed technique. The training bit pattern condition may be adapted to select a bit stream having a distribution in which a frequency shift in a negative direction and a frequency shift in a positive direction are symmetrical with respect to an optimum symbol timing phase from among the plurality of series of bit streams.

The Bluetooth signal receiving device may further include a timing error detector circuit configured to detect errors in the symbol timing for the plurality of series of bit streams if the plurality of series of bit streams satisfies the training bit pattern condition; and a timing error threshold value detector circuit configured to generate the effective error metric by using the detected errors in the symbol timing and to determine whether the effective error metric is larger than a threshold value.

The timing error threshold value detector circuit may be further configured to generate the effective error metric by accumulating the detected errors in the symbol timing via an integrator and to determine whether the effective error metric generated by accumulating the detected errors in the symbol timing is larger than the threshold value.

The timing error detector circuit may be further configured to detect the errors in the symbol timing by using a first sample value sampled based on the symbol timing and a second sample value sampled based on a ½ symbol offset timing in each of positive and negative directions.

The symbol timing offset compensation circuit may be further configured to change the phase of the symbol timing via an interpolator based on the effective error metric.

The training bit pattern discriminator circuit may be further configured to determine whether the plurality of series of bit streams satisfies the training bit pattern condition not only in a preamble interval of Bluetooth but also in an access address or protocol data unit interval of Bluetooth.

The Bluetooth signal receiving device may further include memory configured to accumulate the plurality of series of bit streams, generated by the sampler, up to a preset number, and the training bit pattern discriminator circuit may be further configured to determine whether the plurality of series of bit streams stored in the memory satisfies the training bit pattern condition.

The output of the frequency demodulator has a waveform that is shifted to a negative (−) or positive (+) frequency depending on the information of a bit. If only a segment of a waveform having symmetry with respect to a symbol timing phase is selected as an effective error metric and used for tracking, estimation robust to the randomness of data and inter-symbol interference can be performed.

When the received signal is a signal transmitted through a Gaussian filter, the maximum length of the training bit pattern condition may be determined in accordance with the bandwidth or length of the Gaussian filter. The characteristic of inter-symbol interference is determined in accordance with the length of a Gaussian filter. Since a Gaussian filter having a BT of 0.5 defined in the Bluetooth Smart standard has the characteristic in which 99.999% or more of energy is concentrated within 3 symbols, 3 bits centered on a current bit determine a current frequency shift waveform. In this case, the bandwidth of the Gaussian filter is 3, and thus the training bit pattern condition may be set within 3 bits.

According to another aspect of the present invention, there is provided a Bluetooth signal receiving method including: generating a baseband signal by performing frequency shift modulation on a received signal; sampling the baseband signal based on a symbol timing, and generating a plurality of series of bit streams based on sampled values; determining whether the plurality of series of bit streams satisfies a training bit pattern condition; and compensating the symbol timing of the baseband signal by incorporating a measured error metric as an effective error metric if the plurality of series of bit streams satisfies the training bit pattern condition.

The Bluetooth signal receiving method may further include: detecting errors in the symbol timing for the plurality of series of bit streams if the plurality of series of bit streams satisfies the training bit pattern condition; generating the effective error metric by using the detected errors in the symbol timing; and determining whether the effective error metric is larger than a threshold value.

The determining may include determining whether the plurality of series of bit streams satisfies the training bit pattern condition not only in a preamble interval of Bluetooth but also in an access address or protocol data unit interval of Bluetooth.

The Bluetooth signal receiving method may further include accumulating the plurality of series of bit streams, generated based on the values obtained by sampling the baseband signal based on the symbol timing, up to a preset number, and storing the accumulated plurality of series of bit streams; and the determining may include determining whether the plurality of series of bit streams accumulated up to the preset number and then stored satisfies the training bit pattern condition.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE DISCLOSURE

Embodiments of the present invention will be described in detail with reference to the accompanying drawings. In the following description of the present invention, a detailed description of a related well-known component or function will be omitted when it is determined that the detailed description may make the gist of the present invention obscure.

The prevent invention is not limited to the embodiments. Throughout the accompanying drawings, the same reference symbols designate the same components.

Figure 5:
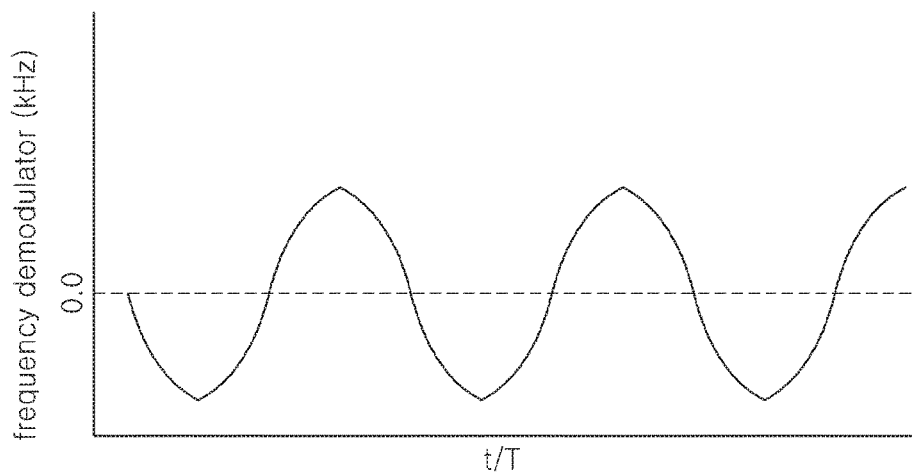
FIG. 5 is a diagram showing an example of the waveform of a preamble having passed through the frequency demodulator of a Bluetooth receiver.

FIG. 5 is a diagram showing an example of the waveform of a preamble having passed through the frequency demodulator of a Bluetooth receiver.

Since Bluetooth Smart prioritizes costs and low power, it allows clock inaccuracy within the maximum range of +/−50 kHz in a packet in order to ease the level of analog circuit design specifications, and thus an optimum symbol timing varies in a packet interval. In order to implement a high-sensitivity receiver, an elaborate timing tracking device is required.

Referring to FIG. 5, assuming that carrier frequency offset has been all compensated for, the waveform of a preamble is transmitted with a frequency shift in a positive (+) direction and a frequency shift in a negative (−) direction forming symmetry with respect to a frequency shift of 0.0 kHz. The frequency-demodulated waveform of the preamble forms a sine wave-like waveform, and thus initial symbol timing acquisition is performed to obtain the correlation between a previously determined preamble bit stream (prescribed in the Bluetooth standard) and a received signal (a waveform, such as that of FIG. 5) and to estimate a point at which a peak occurs as an optimum symbol timing. That is, the symbol timing acquisition does not cause a significant problem with accuracy even when a preamble receiving waveform, such as that shown in FIG. 5, is used.

Figure 6:
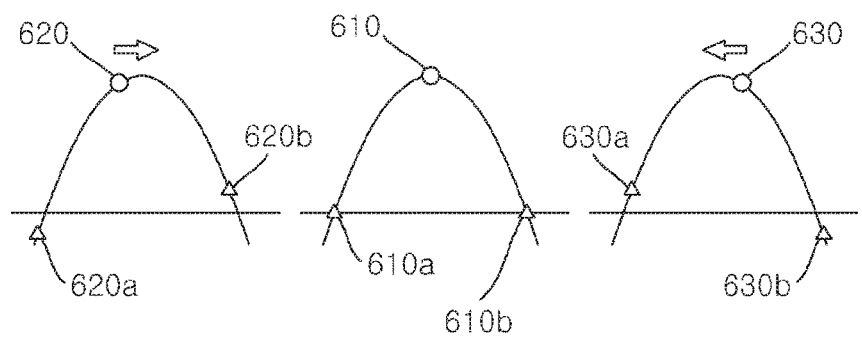
FIG. 6 is a diagram showing the sampling phase of the symbol timing error acquisition technique of a Bluetooth signal receiving device according to an embodiment of the present invention.

FIG. 6 is a diagram showing the sampling phase of the symbol timing error acquisition technique of a Bluetooth signal receiving device according to an embodiment of the present invention.

To detect a symbol timing error, an interpolator and a timing error detector are implemented in a closed loop feedback form. In an embodiment, an error detected by the timing error detector may be calculated as an error metric by a loop filter or an integrator, and the error metric may be incorporated into the adjustment of a timing phase by the interpolator.

Representative methods for detecting a timing error, which is used by the timing error detector, are the Gardner algorithm and the Mueller & Muller algorithm. In an embodiment of the present invention, all the two methods may be applied.

For ease of description, a method of detecting a timing error will be described based on the Gardner algorithm below. The Gardner algorithm is a method of estimating an error in symbol timing for a received signal by using a sample value â(n) at a currently applied symbol timing and sample values (z(n+½),z(n−½)) at a ½ symbol offset point. The error metric may be determined, as shown in Equation 1 below:

$$\varepsilon = \hat{a}(n) \cdot \left\{ z\left(n + \frac{1}{2}\right) - z\left(n - \frac{1}{2}\right) \right\} \quad (1)$$

In FIG. 6, a symbol timing 610 is an optimum symbol timing. The signal waveform is symmetrical with respect to the symbol timing 610, a sample value at a −½ symbol offset point 610a is identical to a sample value at a +½ symbol offset point 610b, and thus an error metric is obtained as 0.

A symbol timing phase deviating from the optimum is shown at a symbol timing 620. A sample value at a −½ symbol offset point 620a is not identical to a sample value at a +½ symbol offset point 620b, and thus an error metric is obtained as a value other than 0. Another symbol timing phase deviating from the optimum is shown at a symbol timing 630. In the same manner, a sample value at a −½ symbol offset point 630a is not identical to a sample value at a +½ symbol offset point 630b, and thus an error metric is obtained as a value other than 0.

It can be seen that the error metric has a positive (+) sign for the symbol timing 620 and thus, given a sign wave-like waveform, a symbol timing will be close to the optimum symbol timing 610 only if the sampling point is deferred after the symbol timing 620. In contrast, it can be seen that the error metric has a negative (−) sign for the symbol timing 630 and thus a symbol timing will be close to the optimum symbol timing 610 only if the sampling point is advanced before the symbol timing 630. The size of a timing that is adjusted during the adjustment of a sampling phase may be selected in proportion to the absolute value of an error metric.

Figure 7:
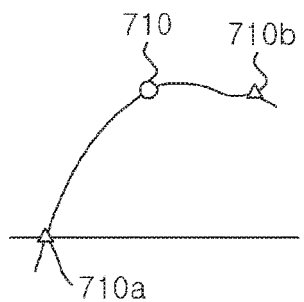
FIG. 7 is a diagram showing an example in which an error metric is not zero in spite of an optimum symbol timing due to the random characteristic of data.

FIG. 7 is a diagram showing an example in which an error metric is not zero in spite of an optimum symbol timing due to the random characteristic of data.

If a symbol-based waveform has a form in which a half-period segment of a sine wave-like wave is repeated, an error metric valid for all symbols can be calculated. Since data transmission has a random bit characteristic and amplitude varies during a modulation process, a measured error does not become zero even when a symbol timing is accurate, as shown in FIG. 7, and thus significantly high jitter may occur randomly, thereby reducing estimation performance.

A Gaussian frequency shift keying method is a method of applying a Gaussian filter to a bit stream in order to increase spectrum efficiency. In this case, inter-symbol interference occurs during a filtering process, and distorts a signal waveform. For example, the above-described preamble is a bit combination in which a negative (−) frequency shift and a positive (+) frequency shift appear symmetrical with respect to an optimum symbol timing phase, and thus there is no problem in applying a timing error estimation method. In randomly generated access address and protocol data unit intervals, a negative (−) frequency shift and a positive (+) frequency shift do not appear symmetrical due to inter-symbol interference, and thus jitter may occur when a typical timing error estimation method is applied to tracking. That is, in the data interval, an asymmetric waveform is generated depending on the combination of transmission bit streams, so that an erroneous error metric is incorporated thereinto regardless of the accuracy of timing and thus expected performance cannot be obtained.

Referring to FIGS. 5 and 6, it is assumed that a symbol timing 710 has been applied by taking into account an obtained symbol timing. Although a sampled value at a −½ symbol offset point 710a must be identical to a sampled value at a +½ symbol offset point 710b when a signal is symmetrical, the symmetry of the signal is destructed by inter-symbol interference, the amplitude of the signal changes, and thus it seems that the obtained symbol timing 710 will include jitter. In sum, high jitter occurs in the symbol timing error estimator due to inter-symbol interference attributable to the Gaussian filter and the randomness of a data symbol, and thus a loop filter is required to reduce the degrading of performance attributable to jitter. The loop filter removes a noise component while performing an averaging function. When the bandwidth of the filter is reduced, an advantage arises in that the accuracy of timing is increased, and a disadvantage arises in that convergence speed is decreased. In contrast, when the bandwidth of the filter is increased, an advantage arises in that convergence speed is increased, and a disadvantage arises in that the accuracy of timing is decreased. A compromise scheme is implemented as a method of advancing convergence by increasing the bandwidth of a loop filter in the early stage of operation and increasing accuracy by reducing the bandwidth of the loop filter when an error metric is decreased to a predetermined level or lower.

However, the method is suitable for circuitry communication that is not highly limited by training time, such as DTV, and is not suitable for packet communication in which separate training time is not present except for an 8-μs preamble, like Bluetooth Smart. When training continues throughout the access address and protocol data unit data intervals, a problem arises in that high jitter (self noise) occurring due to the initial wide bandwidth of the loop filter inversely reduces performance and generates a packet error. Accordingly, this becomes a factor that makes it difficult to apply a timing error acquisition algorithm, used in a linear demodulation method, to packet communication using a nonlinear demodulation method.

Figure 8:
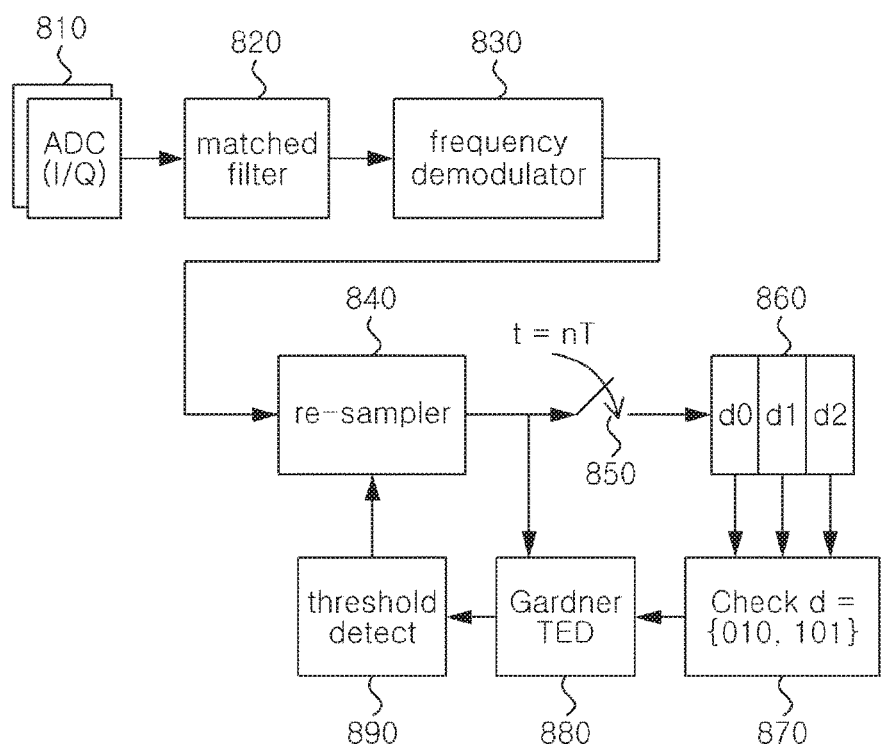
FIG. 8 is a diagram showing a Bluetooth signal receiving device according to an embodiment of the present invention.

FIG. 8 is a diagram showing a Bluetooth signal receiving device according to an embodiment of the present invention. Referring to FIG. 8, symbol timing acquisition, tracking and offset compensation (timing recovery), which are performed in the Bluetooth signal receiving device of the present invention, are shown.

There is shown an ADC pair 810 configured to receive an I signal and a Q signal and convert an analog value into a digital value. The output of the ADC pair 810 passes through a matched filter 820, and is then transferred to a frequency shift demodulator circuit 830. For example, the matched filter 820 may receive and process a 4-sample interval signal for each symbol. A waveform having passed through a frequency shift demodulator 530 exhibits the characteristic of a waveform that frequency-shifts within the maximum range of +/−250 kHz. In the Bluetooth signal receiving device, initial symbol timing acquisition is performed to obtain a correlation between a stored preamble and a received signal and to estimate a point at which a peak occurs as an optimum symbol timing. Based on an obtained initial symbol timing phase, a time coarse discriminator/sampler circuit 850 identifies bits based on the signs of a signal at symbol intervals, and transfers information about the identified bits to memory 860. When a bit stream stored in the memory 860 matches a "training bit pattern," a training bit pattern discriminator 870 may notify a timing error detector circuit 880 and a timing error threshold value detector circuit 890 that the bit stream is a sample valid for the calculation of a timing phase error metric.

The timing error detector circuit 880 and the timing error threshold value detector circuit 890 calculate a valid timing phase error metric, and selectively use the valid timing phase error metric for the tracking of a timing error.

The memory 860 may operate in a First-In First-Out (FIFO) manner. The memory 860 may store a number of identified bits equal to a predetermined number, and may evict the oldest bit when storing a new bit.

The training bit pattern discriminator circuit 870 determines whether a plurality of series of bit streams generated by the time coarse discriminator/sampler circuit 850 satisfies a training bit pattern condition. The training bit pattern discriminator circuit 870 may determine whether a bit stream satisfying the training bit pattern condition is present among a plurality of series of bit streams stored in the memory 860 as described above. When the stored bit stream or generated bit stream satisfies a "training bit pattern condition," the timing error detector circuit 880 and the timing error threshold value detector circuit 890 selectively acquire and track symbol timing offset from each bit stream satisfying the training bit pattern condition.

In Gaussian frequency shift keying communication, inter-symbol interference occurs due to the Gaussian filtering of a bit stream and minimum and maximum frequency shifts do not appear symmetrically due to random data pattern. Accordingly, a problem arises in that although symbol timing offset is not actually present (in spite of an appropriate symbol timing), the obtained value of the timing error detector circuit 880 does not appear as zero, and also acquisition and tracking performance robust to relatively high noise is required to implement a high-sensitivity receiver. The conventional NDA prediction technique uses a loop filter in order to reduce high jitter occurring in the condition. In this case, the training time of a loop filter is long, and thus a bit error occurring during the training time has a harmful influence on packet communication.

The output of the frequency shift demodulator circuit 830 has a waveform that is shifted to a negative (−) or positive (+) frequency depending on the information of a bit. Only if a segment of a waveform having symmetry is selected as an effective error metric and used for tracking can tracking robust to inter-symbol interference be achieved.

Although the case where the timing error detector circuit 880 uses the Gardner algorithm has been described as an example for ease of description, the Bluetooth signal receiving device of the present invention may use the Mueller & Muller algorithm to detect a timing error, and various well-known timing error acquisition techniques may be modified to be suitable and used for the Bluetooth signal receiving device of the present invention.

Figure 9:
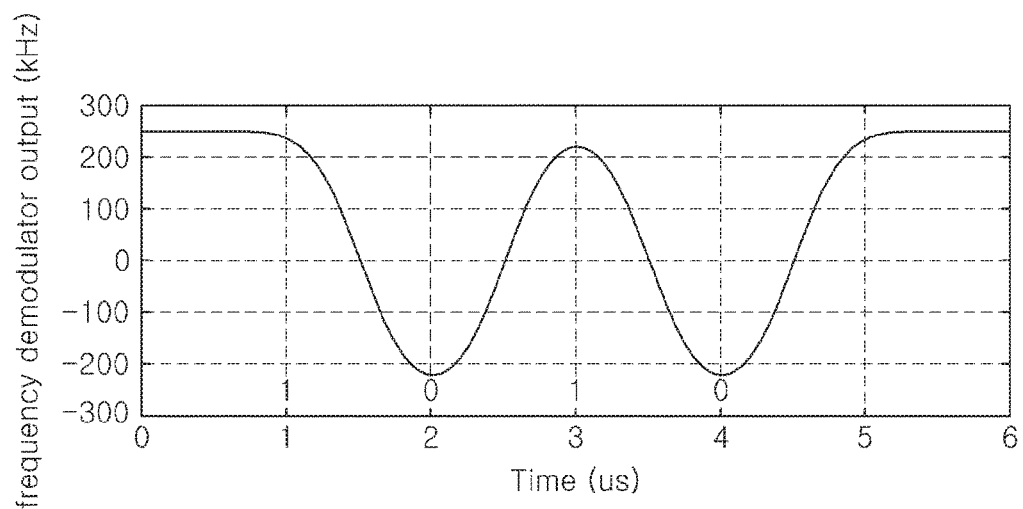
FIG. 9 is a diagram showing the output waveform of a frequency demodulator for a training bit pattern according to an embodiment of the present invention.

FIG. 9 is a diagram showing the output waveform of a frequency demodulator for a training bit pattern according to an embodiment of the present invention.

Referring to FIG. 9, the bit stream "10101b" is received, and an output waveform having passed through the frequency shift demodulator circuit 830 is shown.

Preferred embodiments of a "training bit pattern" in which an error metric becomes zero at an optimum symbol timing phase may be 010b, 101b, and combinations thereof. For example, 0101b is the combination of "training bit patterns" in which 010b and 101b are repeated twice. As shown in FIG. 9, error metrics measured at second and third symbol timings may be selected as effective error metrics, and may be incorporated into timing tracking. That is, the second symbol "0" is located between the symbols "1" having opposite polarities in front of and behind the second symbol "0," and thus the waveform of the second symbol "0" will maintain symmetry. Furthermore, the third symbol "1" is located between the symbol "0" having opposite polarities in front of and behind the third symbol "1," and thus the waveform of the second symbol "1 will maintain symmetry. In this case, the second symbol "0" and the third symbol "1" may be samples that are all appropriate for the obtainment of a effective error metric.

The conventional NDA prediction technique is configured to estimate error metrics for all symbols and to incorporate the error metrics thereinto, and thus there is a high possibility that high jitter enters indiscriminately and causes loss in terms of accuracy and training time. Since the technique proposed by present invention selectively incorporates only effective error metrics thereinto unlike the conventional technology, high jitter does not occur, and a device, such as a loop filter for reducing self noise, is not required. The timing error detector circuit 880 detects timing errors for sampling bit streams determined to be valid, and transfers information about the timing errors to the timing error threshold value detector circuit 890. The timing error threshold value detector circuit 890 simply accumulates timing errors for the valid sampling bit streams via an integrator, and transfers information about the timing errors to a resampler/compensation circuit 840 when the number of timing errors exceeds a threshold value. In this case, the transferred cumulative value of the timing errors may be recognized as an effective error metric. The resampler/compensation circuit 840 may be implemented as a simple configuration, such as an interpolator, and may compensate for the offset of a symbol timing phase by changing a symbol timing phase based on the effective error metrics, received from the timing error threshold value detector circuit 890.

The timing error detector circuit 880, the timing error threshold value detector circuit 890, and the resampler/compensation circuit 840 may be implemented without including a complex configuration, such as a loop filter, and may rapidly compensate for a timing error because it does not require separate training time. This enables a symbol timing phase to be appropriately selected and optimum bit streams to be sampled in a Bluetooth Classic or Bluetooth Smart standard-based packet having low tolerance in terms of timing.

The characteristic of the inter-symbol interference is determined in accordance with the length of a Gaussian filter. Since a Gaussian filter having a BT of 0.5 defined in the Bluetooth Smart standard has the characteristic in which 99.999% or more of energy is concentrated within 3 symbols, 3 bits centered on a current bit determine a current frequency shift waveform. For example, assuming that the bit stream "101b" has been transmitted by a transmitter, a segment in which a minimum frequency shift is performed toward a negative (−) direction at a central bit location is output. Assuming that the complementary bit stream "010b" has been transmitted, a segment in which maximum frequency shift is performed toward a positive (+) direction at a central bit location is output. An inter-symbol interference characteristic is determined based on the length of the Gaussian filter. The two segments each have symmetry with respect to an optimum symbol timing phase corresponding to a peak, as shown in 4, and are appropriate for the estimation of symbol timing offset. Although the embodiment in which the training bit pattern condition is derived using the 3-symbol Gaussian filter as an example, the number of symbols may be determined based on a symbol interval, which is significant in terms of probability or in which a predetermined percentage or more of energy is concentrated, by taking into account a transmission/receiving environment or the configuration of a circuit in another embodiment of the present invention.

Figure 1:
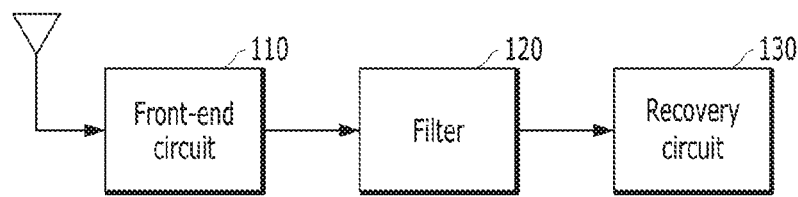
FIG. 1 is a block diagram showing the configuration of a typical Bluetooth receiver.
Figure 2:
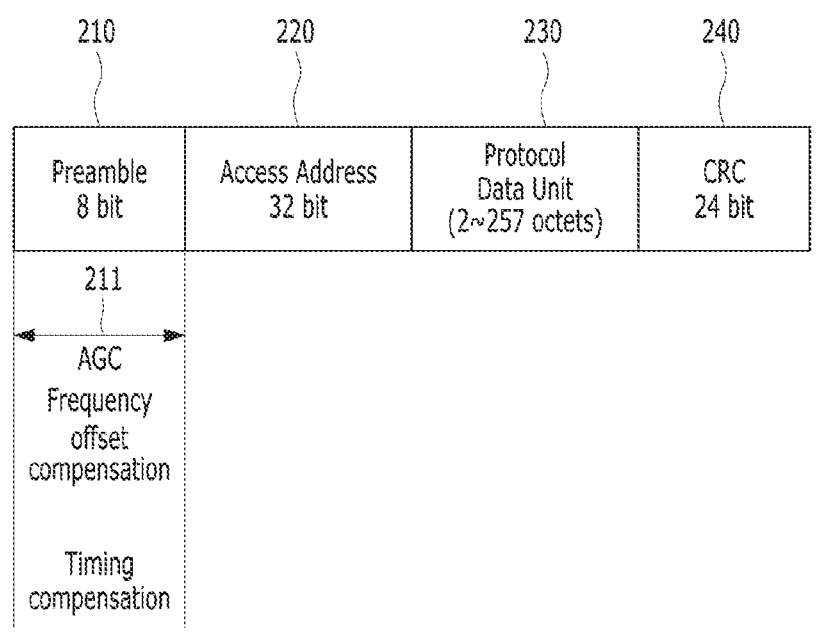
FIG. 2 is a diagram showing a typical packet of Bluetooth Smart.
Figure 3:
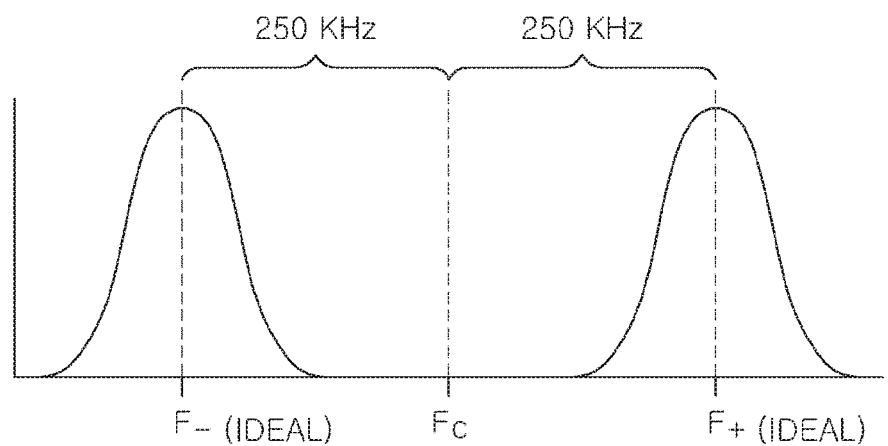
FIG. 3 is a diagram showing the frequency characteristic of a modulated signal that is transmitted by a Bluetooth transmitter in an ideal environment in which noise and frequency offset are not present.
Figure 4:
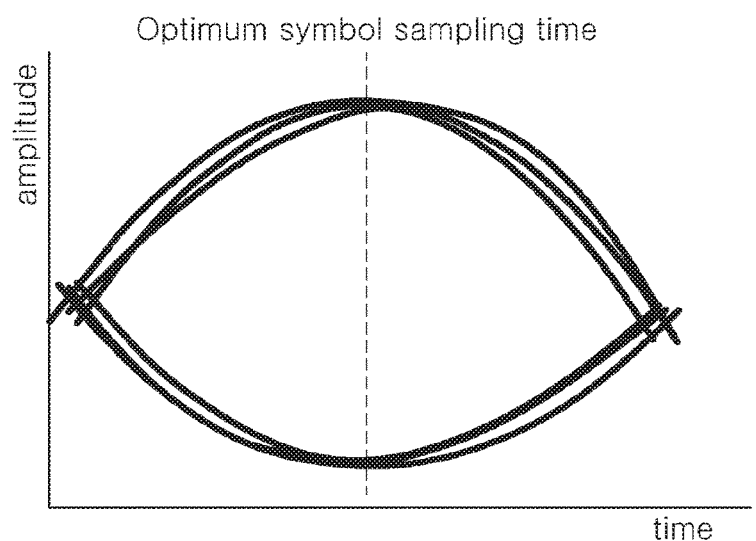
FIG. 4 is an eye diagram in which frequency-demodulated waveforms are accumulated at symbol intervals.

The operation of the Bluetooth signal receiving device of the present invention will be described with reference to the packet of the Bluetooth Smart of FIG. 2. In the packet of Bluetooth Smart, an 8-µs preamble interval 210 and a 32-µs access address interval 220 are present. The Bluetooth signal receiving device of the present invention may acquire symbol timing offset by using a selective bit stream decision-oriented technique within the 8-µs preamble interval 210, and may track the symbol timing offset during the 32-µs access address interval 220 and the following protocol data unit interval 230.

Since there is no guarantee that the symbol timing offset initially obtained within the preamble interval 210 at step 610 is maintained in the access address interval 220 and the protocol data unit interval 230 without change, the Bluetooth signal receiving device of the present invention may track changes in a transmission/receiving environment or changes in offset within a clock inaccuracy specification in the access address interval 220 and the protocol data unit interval 230 at step 620.

Figure 10:
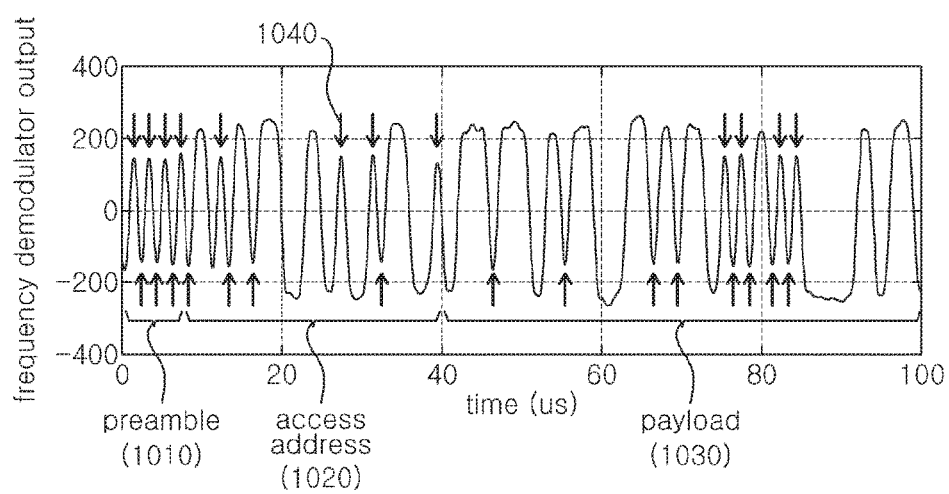
FIG. 10 is a diagram showing the decision of a "training bit pattern" and a point, at which selective symbol timing tracking is applied, for an example of a packet waveform defined in the Bluetooth Smart standard.

FIG. 10 is a diagram showing the decision of a "training bit pattern" and a point, at which selective symbol timing tracking is applied, for an example of a packet waveform defined in the Bluetooth Smart standard.

Referring to FIG. 10, there is shown an example of a waveform obtained after a Bluetooth Smart packet signal has passed through the frequency shift demodulator 830 of the receiver. For ease of description, the waveform shown in FIG. 10 is shown on the assumption that carrier frequency offset and DC offset have been removed.

Referring to FIG. 10, a preamble 1010 is received during initial 8 µs, an access address 1020 is received during the following 32 µs, and a protocol data unit 1030 is received thereafter. To help to understand the operation of the Bluetooth signal receiving device of the present invention, a "training bit pattern" 1040, which becomes a sampling reference for an effective error metric, is emphasized. The training bit pattern 1040 refers to the case where a center bit value is opposite to adjacent bit values located in front of and behind the center bit value. In this case, since the waveform of the center bit value will maintain symmetry, the accuracy of a symbol timing phase may be viewed as being maintained in spite of an influence, such as a noise error or the like, attributable to a Gaussian filter or a transmission/receiving environment.

Referring to FIG. 10, in the case of the interval of the preamble 1010 in which a training bit pattern is sequentially repeated, successive 8 training bit patterns may be extracted. Since the preamble 1010 includes 8 alternate bit streams and is selected such that and the first bit of the access address 1020 and the last bit of the preamble 1010 have opposite polarities, the length of the alternate bit streams is 9, seven training bit patterns may be extracted during the training interval of the preamble 1010 because a first bit stream is excluded from the training bit patterns, and one more training bit pattern is given during the initial period of the interval of the access address 1020.

Thereafter, the Bluetooth signal receiving device may discriminate a training bit pattern, which can be a valid sample, among randomly transmitted/received bit streams, the timing error detector circuit 880 may detect a timing error for only the training bit pattern that can be a valid sample, and the Bluetooth signal receiving device may compensate for a timing phase and perform resampling based on the detected timing error.

Figure 11:
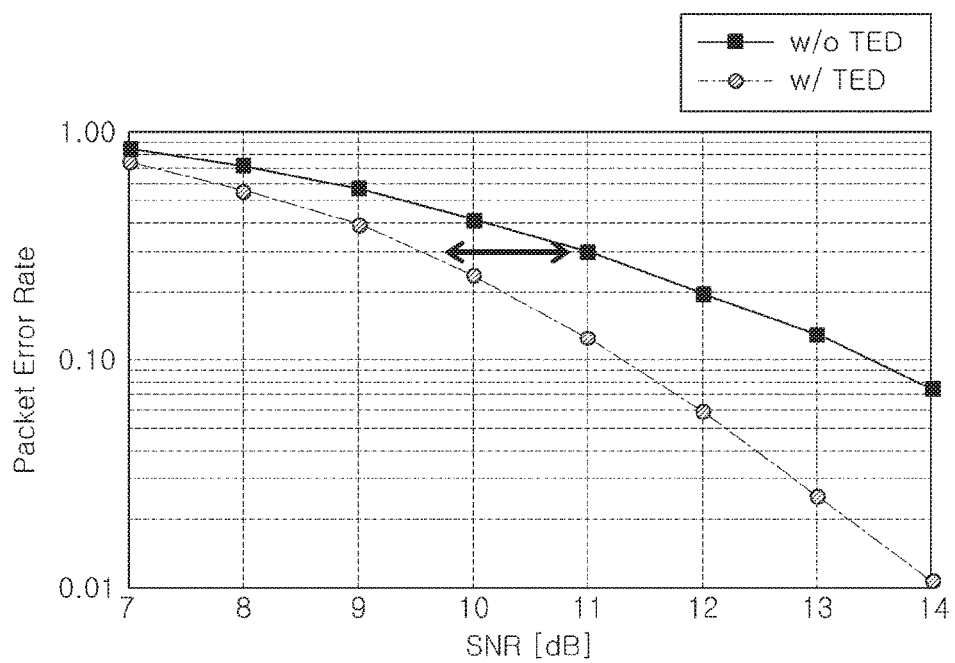
FIG. 11 shows comparisons in performance according to the presence or absence of a timing tracking device in the 50 ppm clock inaccuracy environment of a dirty transmitter defined in the Bluetooth Smart standard.

FIG. 11 shows comparisons in performance according to the presence or absence of a timing tracking device in the 50 ppm clock inaccuracy environment of a dirty transmitter defined in the Bluetooth Smart standard.

Referring to FIG. 11, it can be seen that a Bluetooth signal receiving method not using a conventional timing error acquisition technique must maintain an SNR of 11 dB in order to maintain the same packet error rate (PER) while a Bluetooth signal receiving method using the timing error acquisition technique of the selective bit stream decision-oriented technique of the present invention maintains an SNR of 9.6 dB, thereby exhibiting the improvement of performance corresponding to about 1.4 dB.

Figure 12:
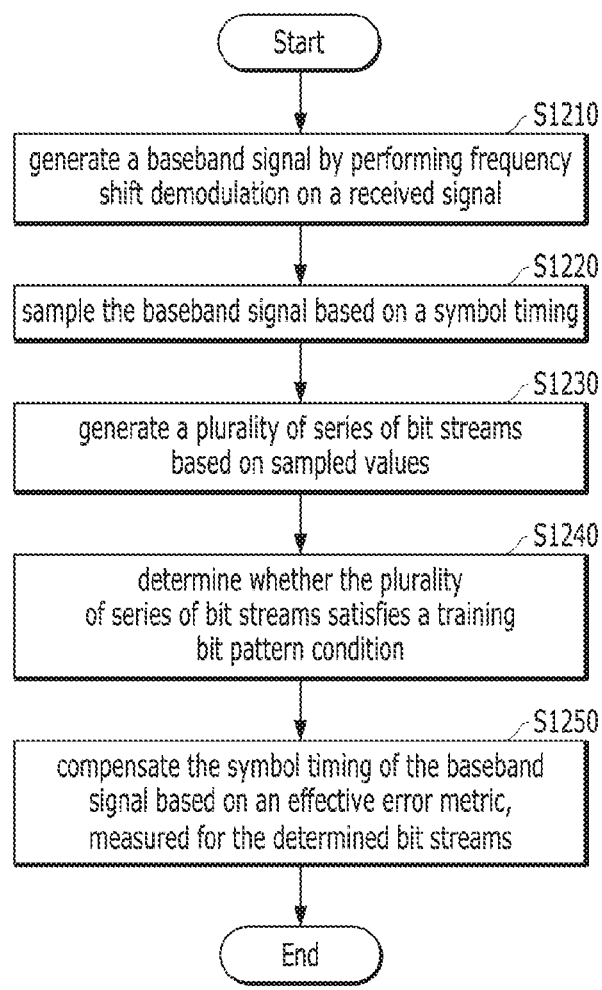
FIG. 12 is an operation flowchart showing a Bluetooth signal receiving method according to another embodiment of the present invention.

FIG. 12 is an operation flowchart showing a Bluetooth signal receiving method according to another embodiment of the present invention.

Referring to FIG. 12, the Bluetooth signal receiving method includes step S1210 of generating a baseband signal by performing frequency shift demodulation on a received signal.

The Bluetooth signal receiving method includes step S1220 of sampling a baseband signal based on a symbol timing, and step S1230 of generating a plurality of series of bit streams based on sampled values. In this case, the symbol timing used at step S1220 may be an initially obtained symbol timing or a symbol timing adjusted through compensation. At step S1230, the plurality of series of bit streams may be generated based on the signs of the sampled signals. That is, the series of bit streams may be generated by mapping a signal having a positive sign (+) to the bit "1" and a signal having a negative sign (−) to the bit "0."

The Bluetooth signal receiving method includes step S1240 of determining whether the series of bit streams satisfy a training bit pattern condition. The training bit pattern condition is adapted to select only a bit stream in which a frequency shift in a negative direction and a frequency shift in a positive direction are symmetrically distributed based on an optimum symbol timing phase from among the plurality of series of bit streams.

The training bit pattern condition may be set using the selective bit stream decision-directed technique.

The Bluetooth signal receiving method includes step S1250 of measuring an error metric for the series of bit streams determined to satisfy the training bit pattern condition and compensating for the symbol timing of a baseband signal by using the measured error metric as an effective error metric. The error metric may be obtained by applying a well-known technology, such as the Gardner algorithm, the Mueller & Muller algorithm, or the like, to the determined series of bit streams.

According to the Bluetooth signal receiving method, a distinguished series of bit streams are accumulated up to a preset number and then stored in memory in order to obtain the error metric. It is determined whether the distinguished series of bit streams accumulated up to a preset number and then stored satisfy the training bit pattern condition.

According to the Bluetooth signal receiving method, when the series of bit stream satisfy the training bit pattern condition, symbol timing errors may be detected for the series of bit streams, the detected symbol timing errors may be accumulated via integral calculation, and whether a cumulative error metric is larger than a threshold value may be detected. In this case, according to the Bluetooth signal receiving method, when the cumulative error metric exceeds the threshold value, symbol timing offset may be compensated for by changing a symbol timing phase by using a resampler implemented as an interpolator.

The present invention is configured to define a "training bit pattern" and propose the "selective bit stream decision-oriented" technique in the Bluetooth Smart packet standard in order to perform carrier acquisition and tracking, and thus an invalid error metric is discarded and a valid error metric is selectively incorporated into offset estimation, thereby reducing jitter and training time. The preamble defined in the Bluetooth Smart standard is configured in a pattern considerably appropriate for the present invention and continuous update can be performed in access address and protocol data unit intervals, so that an error factor attributable to clock inaccuracy allowed in the Bluetooth Smart standard can be effectively removed and a noise averaging effect can be achieved, thereby presenting a method appropriate for the implementation of a high-sensitivity receiver.

The Bluetooth signal receiving method according to the embodiment of the present invention may be implemented in the form of program instructions that can be executed by a variety of computer means, and may be stored in a computer-readable storage medium. The computer-readable storage medium may include program instructions, a data file, and a data structure solely or in combination. The program instructions that are stored in the medium may be designed and constructed particularly for the present invention, or may be known and available to those skilled in the field of computer software. Examples of the computer-readable storage medium include magnetic media such as a hard disk, a floppy disk and a magnetic tape, optical media such as CD-ROM and a DVD, magneto-optical media such as a floptical disk, and hardware devices particularly configured to store and execute program instructions such as ROM, RAM, and flash memory. Examples of the program instructions include not only machine language code that is constructed by a compiler but also high-level language code that can be executed by a computer using an interpreter or the like. The above-described hardware components may be configured to act as one or more software modules that perform the operation of the present invention, and vice versa.

According to the present invention, the symbol timing error detectors of Bluetooth Classic and Bluetooth Smart are implemented using a "selective bit stream decision-directed" technique, and thus a method for selecting a valid error metric and an invalid error metric and performing acquisition and tracking is proposed, thereby providing the effect of overcoming the disadvantage of high jitter that the conventional NDA prediction technique has in packet communication, and thus increasing accuracy. Furthermore, according to the present invention, there is proposed a method for selecting a valid error metric and an invalid error metric by using the "selective bit stream decision-oriented" technique and tracking a symbol timing error, thereby achieving the effect of reducing training time.

According to the present invention, an effective error metric is selected and used for the tracking of symbol timing offset, and thus a small-sized jitter characteristic is achieved, thereby achieving the effect of exhibiting considerably desirable tracking performance even when a complex loop filter is not implemented and the effect of significantly reducing complexity in the implementation of a symbol timing recoverer (a symbol timing error compensator).

According to the present invention, a preamble defined in the Bluetooth Smart standard corresponds to successive "training bit patterns" and is significantly suitable for the application of the present invention, and thus a total of 7 detections can be made when the bit stream of a preamble and the first transmission bit of an access address are combined and the results of acquisition that has been performed a plurality of times can be accumulated, thereby achieving the effect of increasing the accuracy of detection through noise averaging.

While the present invention has been described in conjunction with specific details, such as specific elements, and limited embodiments and diagrams, above, these are provided merely to help an overall understanding of the present invention. The present invention is not limited to these embodiments, and various modifications and variations can be made based on the foregoing description by those having ordinary knowledge in the art to which the present invention pertains.

Therefore, the technical spirit of the present invention should not be determined based only on the described embodiments, and not only the following claims but also all equivalents to the claims and equivalent modifications should be construed as falling within the scope of the spirit of the present invention.

What is claimed is:

1. A Bluetooth signal receiving device comprising:
   a frequency shift demodulator circuit configured to generate a baseband signal by performing frequency shift modulation on a received signal;
   a sampler circuit configured to:
   sample the baseband signal based on a symbol timing; and
   generate a plurality of series of bit streams based on sampled values;

a training bit pattern discriminator circuit configured to determine whether the plurality of series of bit streams generated by the sampler circuit satisfies a training bit pattern condition; and a symbol timing offset compensation circuit configured to compensate the symbol timing of the baseband signal based on a measured error metric as an effective error metric if the plurality of series of bit streams satisfies the training bit pattern condition, wherein the training bit pattern condition is adapted to select a bit stream having a distribution in which a frequency shift in a negative direction and a frequency shift in a position direction are symmetrical with respect to an optimum symbol timing phase from among the plurality of serious of bit streams.

2. The Bluetooth signal receiving device of claim 1, wherein the training bit pattern condition is set by applying a selective bit stream decision-directed technique.

3. The Bluetooth signal receiving device of claim 1, further comprising:
a timing error detector circuit configured to detect errors in the symbol timing for the plurality of series of bit streams if the plurality of series of bit streams satisfies the training bit pattern condition; and
a timing error threshold value detector circuit configured to:
generate the effective error metric by using the detected errors in the symbol timing; and
determine whether the effective error metric is larger than a threshold value.

4. The Bluetooth signal receiving device of claim 3, wherein the timing error threshold value detector circuit is further configured to:
generate the effective error metric by accumulating the detected errors in the symbol timing via an integrator; and
determine whether the effective error metric generated by accumulating the detected errors in the symbol timing is larger than the threshold value.

5. The Bluetooth signal receiving device of claim 3, wherein the timing error detector circuit is further configured to detect the errors in the symbol timing by using a first sample value sampled based on the symbol timing and a second sample value sampled based on a ½ symbol offset timing in each of positive and negative directions.

6. The Bluetooth signal receiving device of claim 1, wherein the symbol timing offset compensation circuit is further configured to change a phase of the symbol timing via an interpolator based on the effective error metric.

7. The Bluetooth signal receiving device of claim 1, wherein the training bit pattern discriminator circuit is further configured to determine whether the plurality of series of bit streams satisfies the training bit pattern condition in a preamble interval of Bluetooth, in an access address interval of Bluetooth, or protocol data unit interval of Bluetooth.

8. The Bluetooth signal receiving device of claim 1, further comprising a memory configured to accumulate the plurality of series of bit streams, generated by the sampler, up to a preset number;
wherein the training bit pattern discriminator circuit is further configured to determine whether the plurality of series of bit streams stored in the memory satisfies the training bit pattern condition.

9. A Bluetooth signal receiving method comprising:
generating a baseband signal by performing frequency shift modulation on a received signal;
sampling the baseband signal based on a symbol timing, and generating a plurality of series of bit streams based on sampled values;
determining whether the plurality of series of bit streams satisfies a training bit pattern condition; and
compensating the symbol timing of the baseband signal based on a measured error metric as an effective error metric if the plurality of series of bit streams satisfies the training bit pattern condition, wherein the training bit pattern condition is adapted to select a bit stream having a distribution in which a frequency shift in a negative direction and a frequency shift in a positive direction are symmetrical with respect to an optimum symbol timing phase from among the plurality of series of bit streams.

10. The Bluetooth signal receiving method of claim 9, wherein the training bit pattern condition is set by applying a selective bit stream decision-directed technique.

11. The Bluetooth signal receiving method of claim 9, further comprising:
detecting errors in the symbol timing for the plurality of series of bit streams if the plurality of series of bit streams satisfies the training bit pattern condition;
generating the effective error metric by using the detected errors in the symbol timing; and
determining whether the effective error metric is larger than a threshold value.

12. The Bluetooth signal receiving method of claim 9, wherein the determining comprises determining whether the plurality of series of bit streams satisfies the training bit pattern condition not only in a preamble interval of Bluetooth but also in an access address or protocol data unit interval of Bluetooth.

13. The Bluetooth signal receiving method of claim 9, further comprising accumulating the plurality of series of bit streams, generated based on the values obtained by sampling the baseband signal based on the symbol timing, up to a preset number, and storing the accumulated plurality of series of bit streams; and
wherein the determining comprises determining whether the plurality of series of bit streams accumulated up to the preset number and then stored satisfies the training bit pattern condition.

* * * * *